(12) United States Patent
Cheng et al.

(10) Patent No.: US 8,675,762 B2
(45) Date of Patent: Mar. 18, 2014

(54) METHOD OF TRANSFORMING PRE-CODED SIGNALS FOR MULTIPLE-IN-MULTIPLE-OUT WIRELESS COMMUNICATION

(75) Inventors: Fang-Chen Cheng, Randolph, NJ (US); Matthew P. J. Baker, Canterbury (GB)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/098,693

(22) Filed: May 2, 2011

(65) Prior Publication Data
US 2012/0281783 A1 Nov. 8, 2012

(51) Int. Cl.
*H04B 7/02* (2006.01)
*H04L 1/02* (2006.01)

(52) U.S. Cl.
USPC ............ 375/267; 375/259; 375/260; 375/261

(58) Field of Classification Search
USPC ........................................................ 375/267
See application file for complete search history.

(56) References Cited

U.S. PATENT DOCUMENTS

| | | | |
|---|---|---|---|
| 6,750,814 B1* | 6/2004 | Nir et al. ................. | 342/357.77 |
| 2004/0022275 A1* | 2/2004 | Blanchard ................ | 370/535 |
| 2008/0075058 A1* | 3/2008 | Mundarath et al. ...... | 370/342 |
| 2008/0304061 A1* | 12/2008 | Ossikovski et al. ...... | 356/301 |
| 2009/0041150 A1* | 2/2009 | Tsai et al. ................ | 375/267 |
| 2010/0166098 A1* | 7/2010 | Luz et al. ................. | 375/267 |
| 2010/0208838 A1* | 8/2010 | Lee et al. ................. | 375/267 |
| 2010/0215112 A1* | 8/2010 | Tsai et al. ................ | 375/267 |
| 2010/0238913 A1* | 9/2010 | Xia et al. ................. | 370/342 |
| 2010/0284484 A1* | 11/2010 | Jongren et al. .......... | 375/267 |
| 2010/0296564 A1* | 11/2010 | Aryanfar et al. ........ | 375/224 |
| 2011/0007685 A1* | 1/2011 | Ma et al. ................. | 370/315 |
| 2011/0085618 A1* | 4/2011 | Zhuang et al. ........... | 375/296 |
| 2011/0142147 A1* | 6/2011 | Chen et al. .............. | 375/260 |
| 2012/0027113 A1* | 2/2012 | Gaal et al. ............... | 375/267 |
| 2012/0140801 A1* | 6/2012 | Asplund et al. .......... | 375/219 |
| 2013/0100875 A1* | 4/2013 | Chun et al. .............. | 370/312 |
| 2013/0121432 A1* | 5/2013 | Mondal et al. ........... | 375/267 |

FOREIGN PATENT DOCUMENTS

| | | |
|---|---|---|
| EP | 2031814 A2 | 3/2009 |
| WO | WO 2008/098225 A2 | 8/2008 |
| WO | WO 2010/064827 A2 | 6/2010 |

OTHER PUBLICATIONS

International Search Report PCT/US2012/035735 dated Aug. 22, 2012.
Written Opinion dated Aug. 22, 2012.

* cited by examiner

*Primary Examiner* — Erin File
(74) *Attorney, Agent, or Firm* — Davidson Sheehan, LLP

(57) ABSTRACT

The present invention provides a method of transforming pre-coded signals for transmission over an air interface in a MIMO wireless communication system. Embodiments of the method may include applying, at a transmitter, a transform matrix and a pre-coding matrix to a signal prior to transmitting the signal using a plurality of antennas deployed in a first antenna configuration. The pre-coding matrix is selected from a codebook defined for a second antenna configuration deployed in a non-scattering environment. The transform matrix is defined based on the first antenna configuration and a scattering environment associated with the transmitter.

44 Claims, 10 Drawing Sheets

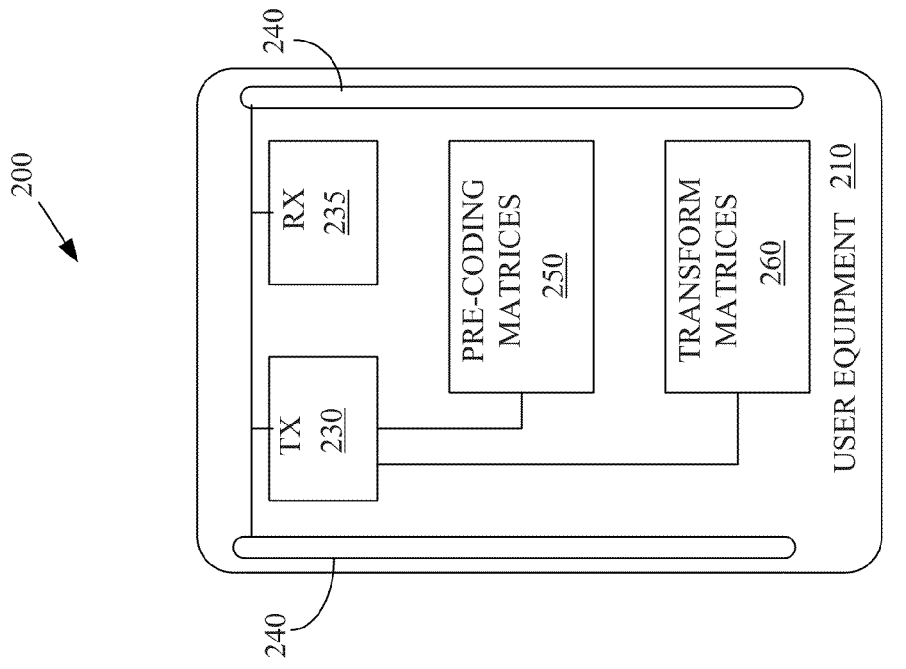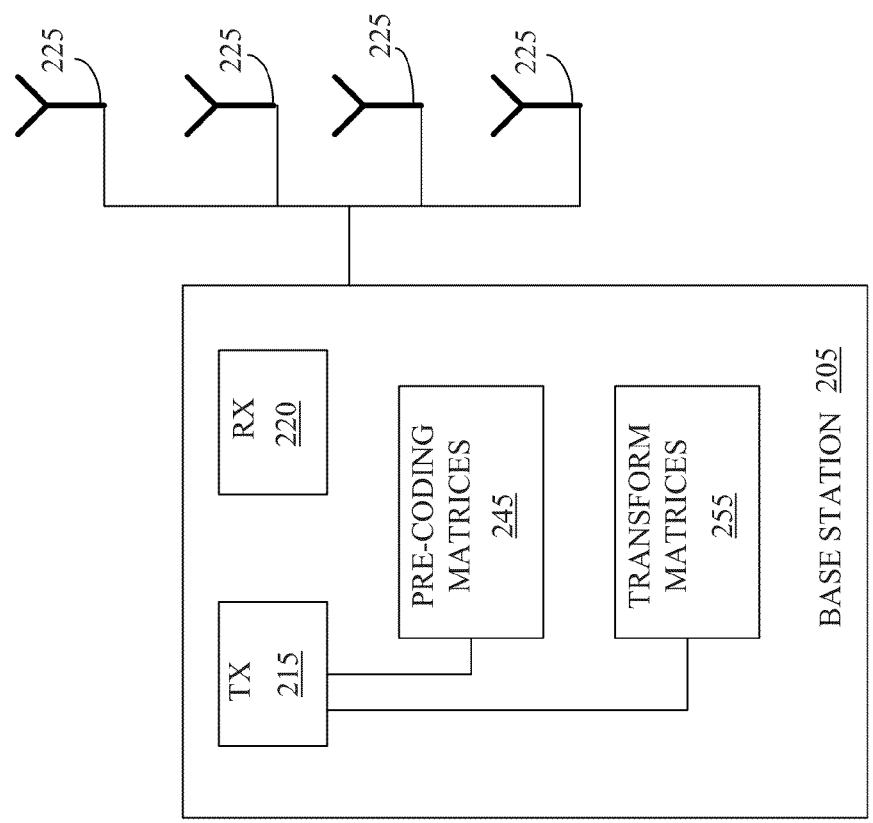
Figure 2

METHOD OF TRANSFORMING PRE-CODED SIGNALS FOR MULTIPLE-IN-MULTIPLE-OUT WIRELESS COMMUNICATION

BACKGROUND OF THE INVENTION

1. Field of the Invention

This invention relates generally to communication systems, and, more particularly, to wireless communication systems.

2. Description of the Related Art

Wireless communication systems typically use radiofrequency signals to convey information over an air interface between transmitters and receivers. For example, a base station (or eNodeB) may communicate with user equipment (UE) using transceivers implemented in the base station and the user equipment. The simplest transceivers use a single antenna to transmit and receive the radiofrequency signals. However, more advanced transceivers can use more than one antenna for transmission and reception of signals transmitted over the air interface. For example, base stations can employ arrays of 2, 4, 8, or more antennas for transmitting and receiving radiofrequency signals over the air interface. User equipment can also implement more than one antenna. Systems that employ multiple antennas on the receiver side and/or the transmitter side are generally referred to as multiple-in-multiple-out (MIMO) communication systems. MIMO systems may also be implemented as single-user MIMO (SU-MIMO) systems or multiple-user MIMO (MU-MIMO) systems.

The wireless communication channels in a MIMO system are defined by a channel matrix that determines the signal strength received at the receiver-side antennas as a function of the signal strength transmitted by the transmit-side antennas. The channel matrix is therefore a function of the transmitter and receiver antenna configurations, as well as the scattering environment between the transmitter and the receiver. The dimensions of the channel matrix are determined by the number of transmitter-side antennas and receiver-side antennas. Cross-antenna interference, which is represented by the non-diagonal elements of the channel matrix, can in theory be removed by pre-coding transmitted signals to diagonalize the channel matrix. For example, a pre-coding matrix that diagonalizes the downlink channel matrix could be determined for each UE using a conventional eigenvalue/eigenvector decomposition of the channel matrix for symmetrical channel matrix or singular value decomposition of the channel matrix for asymmetrical channel matrix. However, defining a precise pre-coding matrix for each UE requires sufficient feedback from the UE to exactly determine the downlink channel matrix, as well a sufficient computing power to compute the pre-coders in real time. In practice, constraints on the uplink channel overhead and transceiver design make this impossible.

Conventional MIMO systems therefore use a codebook that includes a predetermined quantized set of pre-coding matrices. The codebook includes a set of pre-coding matrices that diagonalize an ideal channel matrix defined for a specific antenna configuration and a non-scattering environment. The transmitter can then choose one of the pre-coding matrices based on feedback received from the receiver. For example, a UE can feedback channel state information that can be used to select a pre-coding matrix to apply to signals transmitted over the downlink to the UE. Exemplary channel state information (CSI) includes channel quality information (CQI), a pre-coding matrix indicator (PMI), a rank indicator, a pre-coding type indication (PTI), and the like. The CQI typically represents the recommended modulation scheme and coding rate that should be used for the downlink transmission, the RI provides information about the rank of the channel and can be used to determine the optimal number of layers that should be used for downlink transmission in spatial multiplexed systems, and the PMI indicates which pre-coding matrix to use, e.g., in closed loop spatial multiplexing systems. The dimensions of the pre-coding codebook are constrained by the control signaling overhead available for providing the necessary feedback.

Codebooks are typically standardized for one assumed antenna configuration, such as a cross-polarization antenna array or a linear antenna array. For example, on the downlink, codebooks for linear arrays of 2, 4, and 8 TX antennas have been standardized for the Rel-10 LTE technical specification to support SU-MIMO and MU-MIMO. The eNodeBs and UE that operate in accordance with the standard must use these codebooks for transmission over the air interface, regardless of their actual antenna configurations. Furthermore, the CSI feedback mechanism design for DL MIMO is based on the standardized codebooks and each UE assumes that the signals it has received were generated by an eNodeB that implements the assumed antenna configuration. For another example, on the uplink, the pre-coding vector assigned to the UE for UL SU or MU-MIMO is based on codebooks for 2 and 4 TX antennas that are defined in the specification established by the Third Generation Partnership Project (3GPP). The eNodeB will assign a codebook from the specified set to each UE regardless of the actual antenna configuration used by the UE.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for transforming pre-coded signals for transmission over an air interface in a MIMO wireless communication system. Embodiments of the method may include applying, at a transmitter, a transform matrix and a pre-coding matrix to a signal prior to transmitting the signal using a plurality of antennas deployed in a first antenna configuration. The pre-coding matrix is selected from a codebook defined for a second antenna configuration deployed in a non-scattering environment. The transform matrix is defined based on the first antenna configuration and a scattering environment associated with the transmitter.

In another embodiment, a method is provided for selecting a transformation to apply to pre-coded signals for transmission over an air interface in a MIMO wireless communication system. Embodiments of the method may include selecting, at a functional entity within a wireless communication network, a transform matrix associated with user equipment. The transform matrix and a pre-coding matrix are selected for application to a signal prior to transmitting the signal using a plurality of antennas deployed in a first antenna configuration. The pre-coding matrix is selected from a codebook defined for a second antenna configuration deployed in a non-scattering environment. The transform matrix is defined based on the first antenna configuration and a scattering environment associated with the transmitter.

In yet another embodiment, a method is provided for determining transform matrices for application to pre-coded signals for transmission over an air interface in a MIMO wireless communication system. Embodiments of the method may include determining a transform matrix for a transmitter based on a first antenna configuration, a second antenna configuration, and a scattering environment associated with the transmitter. The transform matrix and a pre-coding matrix are configured to be applied to a signal prior to transmitting the signal using a plurality of antennas deployed in the first antenna configuration. The pre-coding matrix is selected from a codebook defined for the second antenna configuration deployed in a non-scattering environment.

BRIEF DESCRIPTION OF THE DRAWINGS

The disclosed subject matter may be understood by reference to the following description taken in conjunction with the accompanying drawings, in which like reference numerals identify like elements, and in which:

FIG. 2 conceptually illustrates a second exemplary embodiment of a wireless communication system;

Figure 1:
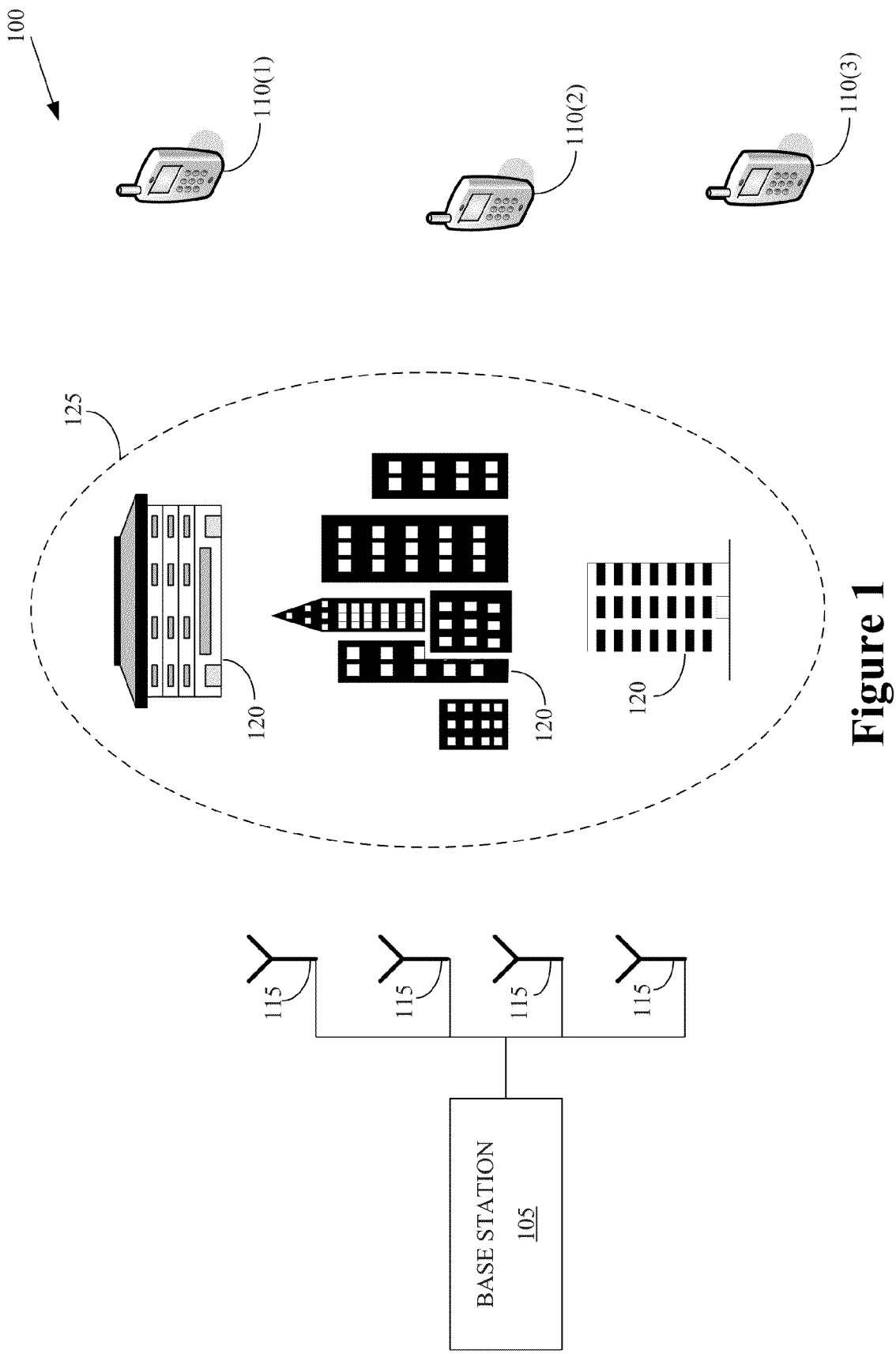
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques of transforming pre-coding matrices to account for different antenna configurations and/or environmental conditions in a multiple-in-multiple-out (MIMO) wireless communication system. Overhead constraints typically limit the number of conventional pre-coding matrices to a predetermined quantized set that is defined for a selected antenna configuration and a non-scattering environment, i.e., the radiofrequency signals are assumed to travel through a perfect vacuum without encountering any obstacles between the transmitting antennas and the receiving antennas. The predetermined codebook therefore does not accurately reflect environmental effects such as scattering and/or fading on the channel matrices that represent the communication channels over the air interface. Furthermore, actual antenna configurations may be very different than the assumed standard configuration. The pre-coding matrices in the predetermined codebook are therefore not optimized to reduce cross-antenna interference for all possible deployments. Conventional channel state information feedback, which is used to select the pre-coding matrix that pre-codes the transmitted signal, is determined under the assumption that received signals were transmitted using the assumed antenna configuration. The feedback may therefore not accurately indicate the actual channels over the air interface for non-standard antenna configurations and/or in a scattering environment.

At least in part to address these drawbacks in the conventional practice, transform matrices may be defined so that applying a transform matrix can convert a channel matrix for a first antenna configuration in a scattering environment associated with a transmitter (e.g., a base station or user equipment) into a channel matrix defined for a second antenna configuration in a non-scattering environment. For example, transform matrices can be computed based on the standard antenna configuration used to define the pre-encoding matrices, the deployed antenna configuration, and simulations of the environmental conditions in the geographical location of the deployed system. The transform matrices may also be calibrated by deploying and testing the transform matrices. Transmitters in base stations and/or user equipment may then apply one or more transform matrices and a selected pre-coding matrix to signals prior to transmitting the signals over the air interface. Reference signals can also be pre-coded using the standard pre-coding matrix and the transform matrix so that feedback information can be accurately determined by receivers on the basis of the standard channel matrix defined for the standard antenna configuration in the non-scattering environment.

FIG. 1 conceptually illustrates a first exemplary embodiment of a wireless communication system 100. In the illustrated embodiment, the wireless communication system 100 operates according to standards and/or protocols that support MIMO transmissions over an air interface between one or more eNodeBs or base stations 105 and one or more mobile units or user equipment 110. For example, the base station 105 may use an array including four antennas 115 for transmitting and/or receiving radiofrequency signals. The antennas 115 may be deployed in a variety of configurations including a linear array, a cross-polarization array, a circular array, and the like. Moreover, persons of ordinary skill in the art having benefit of the present disclosure should appreciate that the array of antennas 115 may include any number of antennas 115. For example, arrays of 2, 4, 8, and 12 antennas are often deployed in various configurations. User equipment 110 may also implement multiple antennas (not shown in FIG. 1) for transmitting and/or receiving radiofrequency signals.

Radiofrequency signals exchanged between the base station 105 and the mobile units 110 do not typically travel through a vacuum. In the illustrated embodiment, the radiofrequency signals may encounter various obstacles and/or scatterers such as buildings 120 and other fixed and/or variable entities such as mountains, trees, vehicles, people, and the like. Moreover, environmental conditions may also influence the propagation of radiofrequency signals over the air interface. These obstacles and/or conditions may collectively be referred to as the scattering environment 125 associated with the base station 105 and/or the user equipment 110. The scattering environment 125 may be location, time, and/or frequency dependent. The location, time, and/or frequency dependence of the scattering environment 125 may be referred to as spatial diversity, temporal diversity, and/or frequency diversity to indicate that the radiofrequency signals propagate through different conditions when they travel between different locations, at different times, and/or have different frequencies. Although the scattering environment 125 is depicted in FIG. 1 as being interposed between the base station 105 and user equipment 110, persons of ordinary skill in the art having benefit of the present disclosure should appreciate that the base station 105 and/or the user equipment 110 may also be immersed in and/or encompassed by the scattering environment 125.

Communication channels over the air interface between the base station 105 and user equipment 110 can be defined in terms of a matrix that is conventionally referred to as the channel matrix H. The dimensions of the channel matrix are determined by the number (M) of antennas implemented in the base station 115 and the number (N) of antennas implemented in user equipment 110 so that the channel matrix H is an M×N matrix. Diagonal elements of the channel matrix may represent the air interface channels corresponding to each antenna and non-diagonal elements represent cross-antenna interference. Pre-coding signals transmitted over the air interface can be used to diagonalize the MIMO channel matrix and reduce or minimize the cross-antenna interference. For example, a pre-coding matrix can be applied to the transmitted signal to reduce or minimize the cross-antenna interference in the received signal.

For the downlink from the base station 105 to the user equipment 110, reference signals transmitted by the base station 105 can also be pre-coded so that the base station 105 can select any pre-coding matrix for the transmissions to user equipment 110. However, in some embodiments, user equipment 110 may assist the selection of a pre-coding matrix by feeding back an indicator of a preferred pre-coding matrix selected from a quantized set of pre-coding matrices with finite dimensions, e.g., a codebook. For example, user equipment 110 may feedback a pre-coding matrix indicator (PMI), as well as other feedback such as a channel quality indicator (CQI), a rank indicator (RI), and/or a pre-coding type indication (PTI)—Collectively, the feedback information provided by the user equipment 110 may be known as Channel State Information (CSI). As discussed herein, the dimension of the pre-coding codebook may be constrained by limits on the overhead available for the control signaling and feedback. Consequently, 2, 4, and 8 Tx antenna codebooks have been standardized for downlink transmissions, e.g., the Rel-10 LTE technical specification defines specific antenna codebooks to support SU-MIMO and MU-MIMO. The CSI feedback mechanism design for DL MIMO is based on the specified codebooks. These codebooks are defined for pre-coding matrices that apply to a standard linear antenna array configuration deployed in a non-scattering environment.

For the uplink from user equipment 110 to the base station 105, the base station 105 (or other entity in the network 100) can assign pre-coding vectors to user equipment 110. For example, base stations 105 that operate according to the Third Generation Partnership Project (3GPP) standard and/or protocols can assign pre-coding vectors for uplink SU or MU-MIMO that are defined based on 2 and 4 TX antenna codebooks defined in the specification. The codebooks defined in the 3GPP standard are optimized for specific antenna configurations (e.g., linear array antenna) and are not optimized for other antenna configurations. If the codebook is not matched with the antenna configuration, the cross-antenna interference can increase and the pre-coding gain may be reduced. Furthermore, defining a codebook for every possible present and future antenna configuration is impractical if not impossible, at least in part because attempting to design and implement such a large number of potential codebooks would add significant complexity at the user equipment 110 and increase the effort required for implementation and testing of the codebooks.

The base station 105 and/or user equipment 110 may therefore use transform matrices to convert channel matrices defined for one antenna configuration and/or scattering environment into channel matrices defined for a different antenna configuration and/or scattering environment. For example, transform matrices can be defined to convert the MIMO channel generated from any arbitrary antenna configuration to the standard MIMO channel that is used to define the standard pre-coding codebooks. The transform matrix may be defined as:

$$H_{std}^{M \times N} = T_C^{M \times K} H_C^{K \times N}$$

where
$H_{std}^{M \times N}$: is an M×N MIMO channel generated from an antenna configuration defined in the standard specification. In a 3GPP LTE system, the DL 4×4 and 2×2 codebooks are generated based on unitary vectors using a Householder transform. The DL 8×8 codebooks are derived based on unitary vectors from discrete Fourier transform (DFT).

$H_C^{K \times N}$ is a K×N MIMO channel generated from an arbitrary deployed antenna configuration.

$T_C^{M \times K}$ is an M×K transform matrix that converts the deployed antenna configuration to the standard M×N MIMO channel.

The transform matrix $T_C^{M \times K}$ may be designed to convert the transmitted waveform of any specific antenna configuration to a waveform that would be generated by a uniform linear array antenna configuration. The effective MIMO channel of the specific antenna configuration after the transformation seen at the receiver would appear similar to the MIMO channel generated from a linear array antenna configuration. Thus, the codebook defined in the standard could be used for any antenna configuration, without having to define new codebooks.

FIG. 2 conceptually illustrates a second exemplary embodiment of a wireless communication system 200. In the illustrated embodiment, a base station 205 and user equipment 210 both support MIMO communication over the air interface. The base station 205 includes a transmitter 215 and a receiver 220 that are used to transmit and receive signals over the air interface using antennas 225. User equipment 210 includes a transmitter 230 and a receiver 235 to transmit and receive signals over the air interface using antennas 240. Persons of ordinary skill in the art having benefit of the present disclosure should appreciate that the number and configuration of antennas 225, 240 is intended to be exemplary and alternative embodiments of the base station 205 and/or user equipment 210 may use different numbers and/or configurations of antennas.

The base station 205 and the user equipment 210 include functionality 245, 250 for generating and/or storing pre-coding matrices that are used to pre-code signals transmitted over the air interface. In the illustrated embodiment, the functionality 245, 250 may be referred to as the codebooks 245, 250. Each codebook 245, 250 is a set of quantized pre-coding matrices (also known as codewords) (or functionality for generating the set) that can be used to pre-code the transmitted signals to reduce or minimize the cross-antenna interference of the MIMO channel between the base station 205 and the user equipment 210. For example, the downlink codebook 245 may be designed to enable the user equipment 210 to feedback the DL MIMO channel for closed loop spatial multiplexing. For another example, the uplink codebook 250 may be designed to allow the base station 205 to assign a pre-coding vector for uplink transmissions in order to achieve optimized MIMO performance. Typically, the standardized codebook is designed to have maximal spatial separation between the beams defined by the pre-coding matrices. If the actual deployed antenna configuration is different than the default antenna configuration designed for the codebook, the spatial separation would not be optimized between pre-coding vectors in the codebook. Moreover, variations in the scattering environment may result in the standard pre-coding vectors generating non-optimal beams.

In some embodiments, the base station 205 may further indicate to the user equipment 210 a subset of the codewords from the codebook. The user equipment 210 may select a codeword from the subset. The base station 205 may for example derive the subset from its antenna configuration. In one embodiment, user equipment 210 includes memory 250 containing a stored predetermined codebook of feedback codewords and the base station 205 can indicate to the user equipment 210 a subset of feedback codewords from which the user equipment 205 may select a codeword. The feedback provided by the user equipment 210 therefore may include a codeword selected from the subset.

Transform matrices 255, 260 may be defined to compensate for the effects of different antenna configurations and/or scattering environment. The transform matrices 255, 260 can be used to modify signals that are transmitted to different user equipment 210, such as data traffic destined for particular user equipment 210, as well as being used to modify various reference signals that are broadcast over the air interface. For example, transform matrices 255 can be designed that are suitable to be applied to the CSI feedback for DL MIMO transmissions and transform matrices 260 can be defined to be applied to the transmit pre-coder for UL MIMO transmissions. For the downlink, in order to support CSI derivation at the user equipment 210, the transform matrix 255 can be applied to the MIMO-related reference signals (RS) used by the base station 205 to estimate the uplink channel to decode the uplink transmissions from the user equipment 210. For example, the transform matrix 255 may be applied to CSI-RS since CSI-RS is a UE-specific configuration. The CSI-RS is used as the reference signal for the CSI measurement and feedback derivation for transmission mode 9, which supports up to 8-layer beam-forming. The CSI-RS could be configured differently for each geographical location or different level in vertical location, e.g. for user equipment 210 that are located at different heights. The transform matrix 255 may not be applied to the cell specific RS (CRS) since the CRS is typically used for non-beam-forming DL transmission modes and associated Radio Link Monitoring (RLM) and Radio Resource Management (RRM) procedures, for which a single antenna port is assumed. For UL MIMO, the CSI information is estimated by the base station 205 using a sounding reference signal (SRS), which may include periodic and aperiodic SRSs. The transform matrix 260 may therefore be applied to the SRS based on the antenna configuration and/or the location of the user equipment 210.

One example of fixed 2-D transform matrix $T_{C,UCA-ULA}^{8 \times 8}$ that may convert an 8 TX antenna uniform circular array (UCA) to an 8 TX antenna uniform linear array (ULA) in the horizontal domain is:

$$T_{C,UCA-ULA}^{8 \times 8} = [w_{-3}, w_{-2}, w_{-1}, w_0, w_1, w_2, w_3, w_4]$$

where $$w_m = \frac{-j^{|m|}}{\sqrt{8}} \begin{bmatrix} 1 \\ e^{-j\frac{2\pi m}{8}} \\ e^{-j\frac{2\pi m \times 2}{8}} \\ e^{-j\frac{2\pi m \times 3}{8}} \\ e^{-j\frac{2\pi m \times 4}{8}} \\ e^{-j\frac{2\pi m \times 5}{8}} \\ e^{-j\frac{2\pi m \times 6}{8}} \\ e^{-j\frac{2\pi m \times 7}{8}} \end{bmatrix}$$

Figure 3:
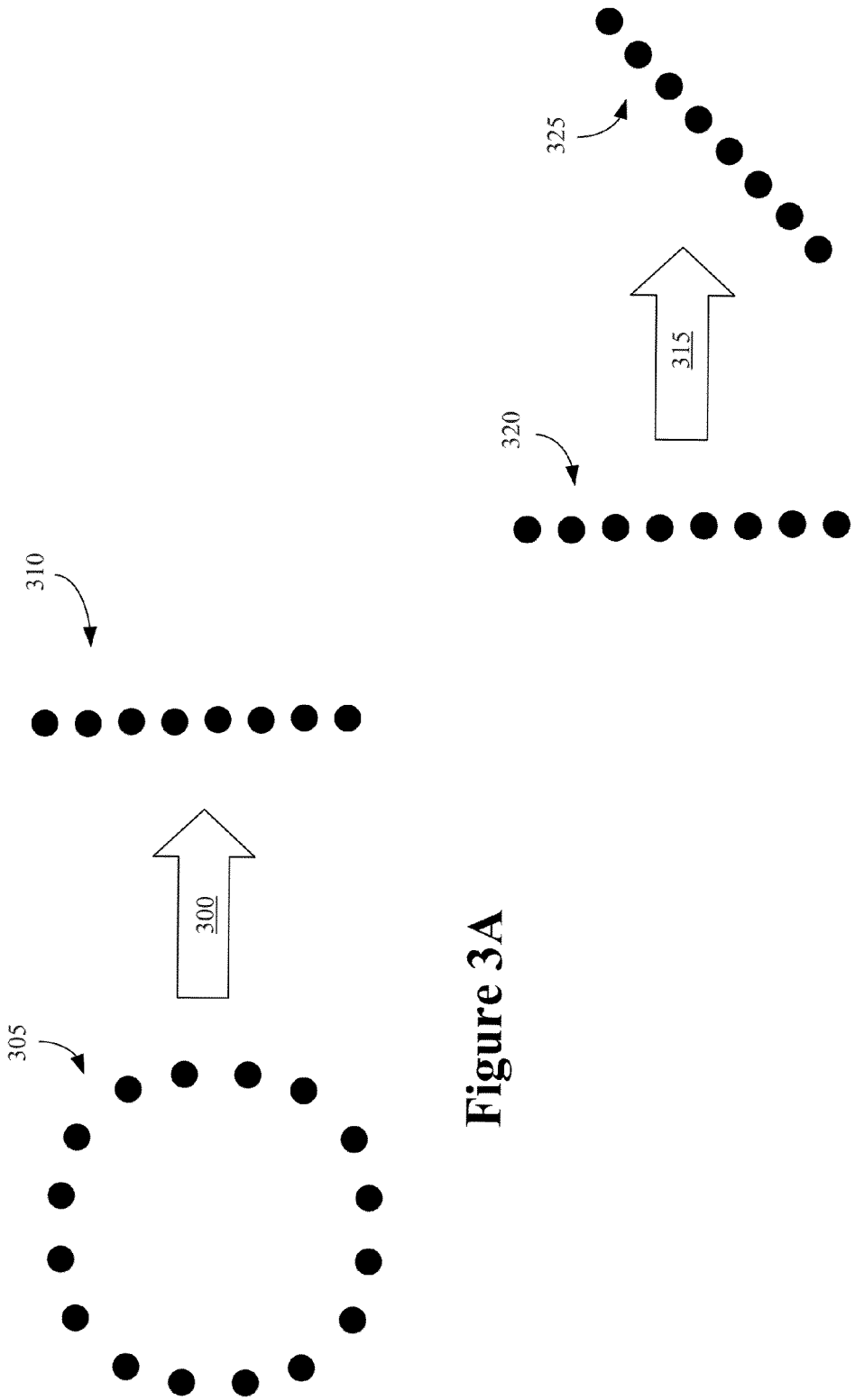
FIG. 3A conceptually illustrates a transformation from a uniform circular array to a uniform linear array.
FIG. 3B conceptually illustrates a transformation from a uniform linear array having a first orientation to a uniform linear array that has a second orientation that is offset from the first orientation by a particular angle.

FIG. 3A conceptually illustrates a transformation 300 from a uniform circular array 305 to a uniform linear array 310. One embodiment of the transformation 300 may correspond to the fixed 2-D transform matrix $T_{C-UCA-ULA}^{8 \times 8}$. However, persons of ordinary skill in the art having benefit of the present disclosure should appreciate that other transform matrices may be used to perform conversions between other types of antenna arrays. For example, FIG. 3B conceptually illustrates a transformation 315 from a uniform linear array 320 having a first orientation to a uniform linear array 325 that has a second orientation that is offset from the first orientation by a particular angle. Other conversions between other types of antenna configurations may also be implemented using different transform matrices.

Figure 4:
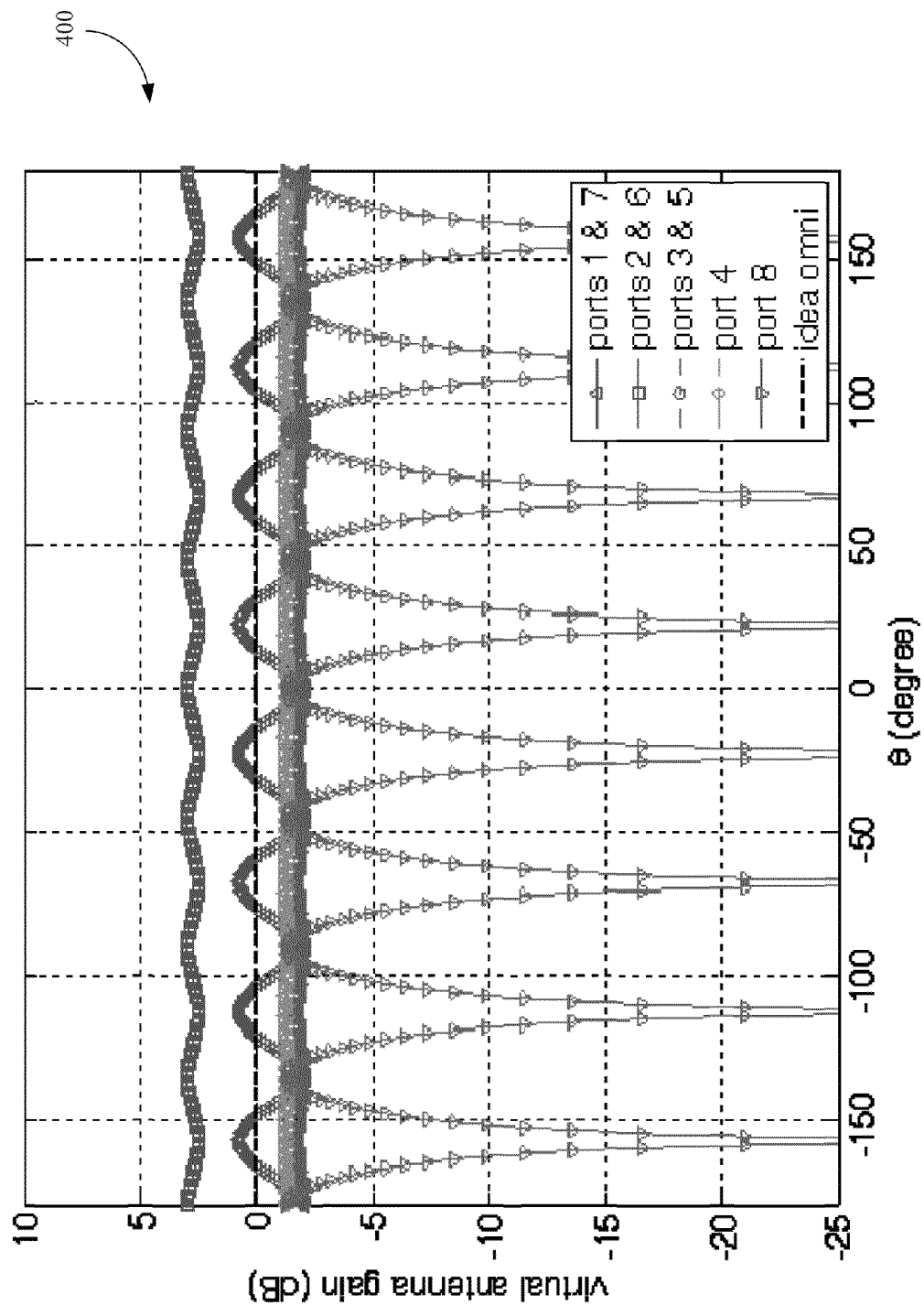
FIG. 4 illustrates a waveform generated by pre-coding a reference signal for transmission over 8 antenna ports.

FIG. 4 illustrates a waveform 400 generated by pre-coding a reference signal for transmission over 8 antenna ports. In the illustrated embodiment, the vertical axis represents a virtual antenna gain measured in dB and the horizontal axis represents the angle (in degrees) relative to a reference angle of 0. The pre-coded waveform 400 assumes a non-scattering environment. User equipment can use the generated waveform 400 in the precoded CSI-RS to derive the CSI feedback in the downlink. In the illustrated embodiment, the virtual antenna gain for ports 1 and 7 is indicated by triangles, ports 2 and 6 are indicated by squares, ports 3 and 5 are indicated by circles, port 4 is indicated by diamonds, and port 8 is indicated by inverted triangles. The virtual antenna gain for each port is determined relative to the ideal omnidirectional virtual antenna gain indicated by the bold dashed line.

Figure 5:
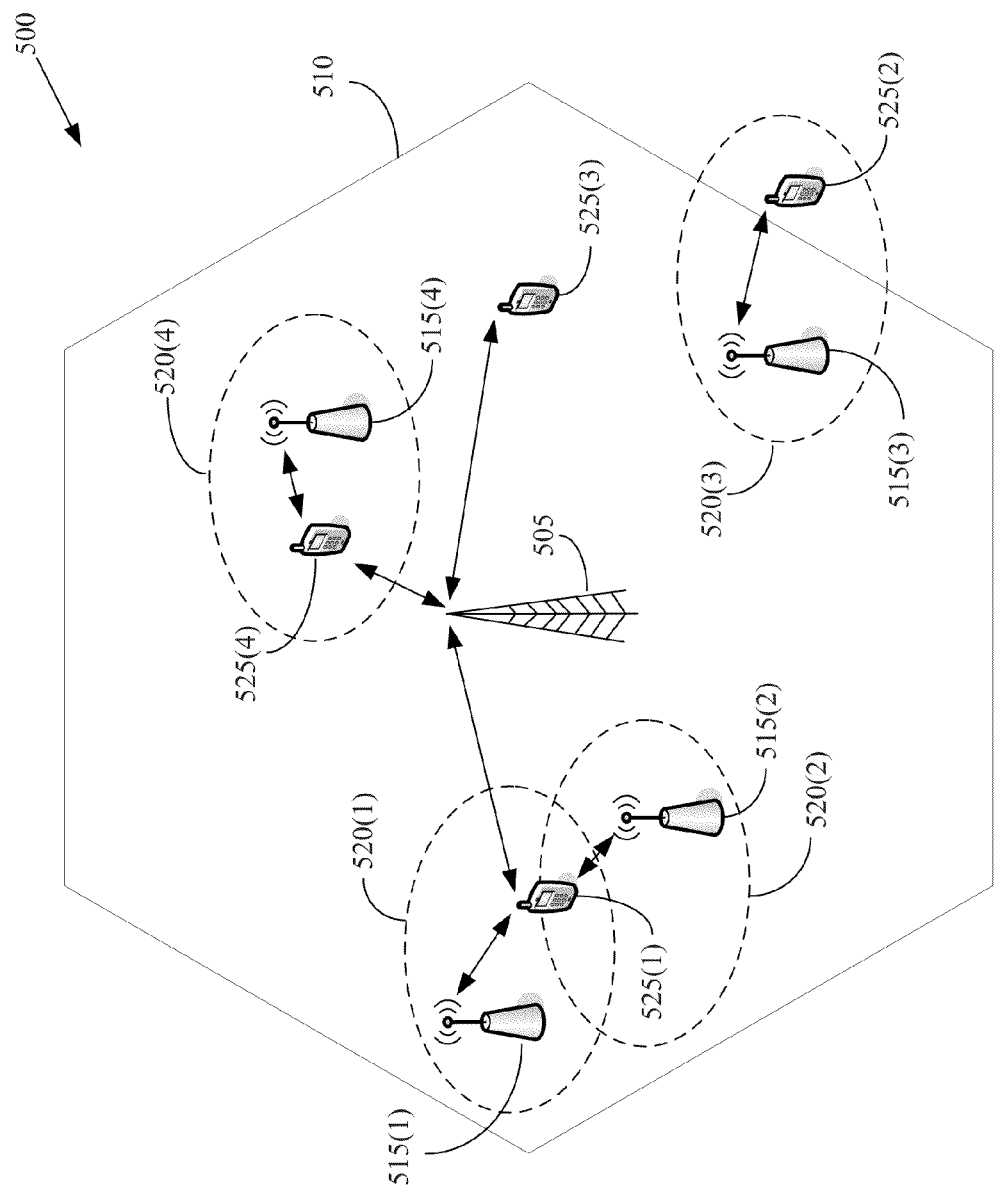
FIG. 5 conceptually illustrates a third exemplary embodiment of a wireless communication system.

FIG. 5 conceptually illustrates a third exemplary embodiment of a wireless communication system 500. In the illustrated embodiment, wireless connectivity is provided by an integrated system including a main antenna 505 that provides wireless connectivity to a cell 510 and a group of remote radio heads (RRHs) 515 that each provides wireless connectivity within a cell or hotspot 520. User equipment 525 can therefore receive wireless connectivity from different combinations of the main antenna 505 and/or one or more RRHs 515. For example, the mobile unit 525(1) may receive wireless connectivity from the main antenna 505 and the RRHs 515 (1-2), the mobile unit 525(2) may only receive wireless connectivity from the RRH 515(3), the mobile unit 525(3) may only receive wireless connectivity from the main antenna 505, and the mobile unit 525(4) may receive wireless connectivity from the main antenna 505 and the RRH 515(4).

The channel matrices that represent channels over the air interfaces between the antennas 505, 515 and different mobile units 525 may therefore be very different and the associated pre-coding matrices may deviate significantly from the standard codebooks defined for a predetermined and/or standardized antenna configuration. In the illustrated embodiment, transform matrices may therefore be specific to different user equipment locations to support different antenna configurations and/or propagation conditions in different geographical areas. For example, a set of transform matrices may be determined based on the antenna configurations and corresponding coverage areas defined by the deployment of the main antenna 505 and the RRHs 515. One or more of the transform matrices may then be selected based on the coordinates of each user equipment 525 and the coverage areas of antennas 505, 515 that make up the antenna configuration that provides wireless connectivity at the location of the user equipment 525. Exemplary antenna configurations may include only the central antenna 505, only one or more RRHs 515, or a combination of the central antenna 505 and one or more RRHs 515, depending on the location of the user equipment 525.

Figure 6:
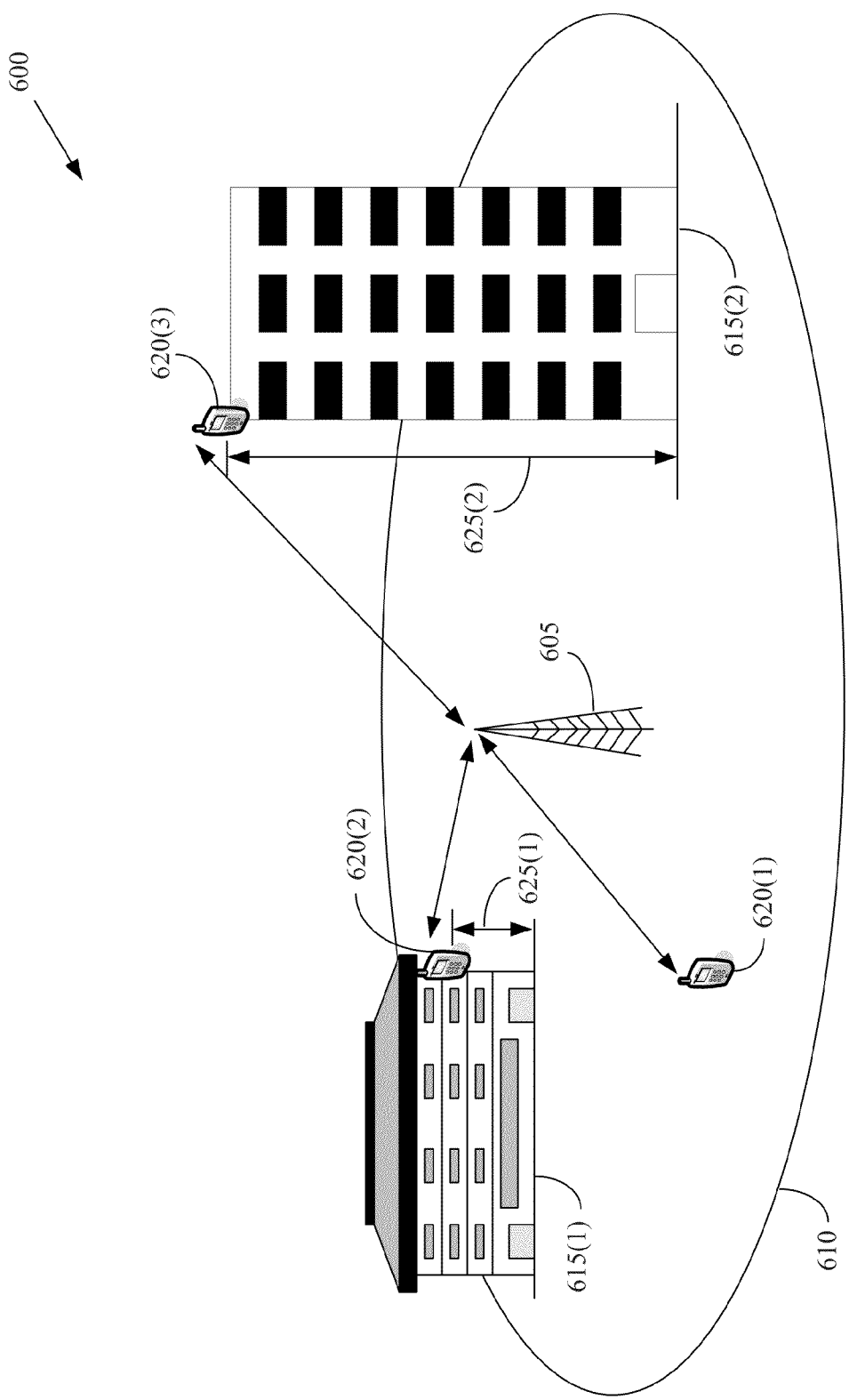
FIG. 6 conceptually illustrates a fourth exemplary embodiment of a wireless communication system.

FIG. 6 conceptually illustrates a fourth exemplary embodiment of a wireless communication system 600. In the illustrated embodiment, wireless connectivity is provided by a main antenna 605 that provides wireless connectivity to a cell 610. Buildings 615 are located within the cell 610 and user equipment 620 may be found at ground level or various different heights, e.g., within the buildings 615. The channel matrices that represent channels over the air interfaces between the antenna 605 and mobile units 620 at different heights may therefore be very different and the associated pre-coding matrices may deviate significantly from the standard codebooks defined for a predetermined and/or standardized antenna configuration. In the illustrated embodiment, 3-D transform matrices may therefore be defined to account for variations in the height of the mobile units 620. For example, one set of transform matrices may be used to convert standard non-scattering matrices into matrices that are appropriate for communication with a ground-level mobile unit 620(1) in the scattering environment of the cell 610. Another set of transform matrices may be used to account for the height 625(1) of the mobile unit 620(2) within the building 615(1). Yet another set of transform matrices may be used to account for the height 625(2) of the mobile unit 620(3) in the building 615(2). In one embodiment, different sets of transform matrices may be defined for particular ranges of vertical displacements and/or angles.

Figure 7:
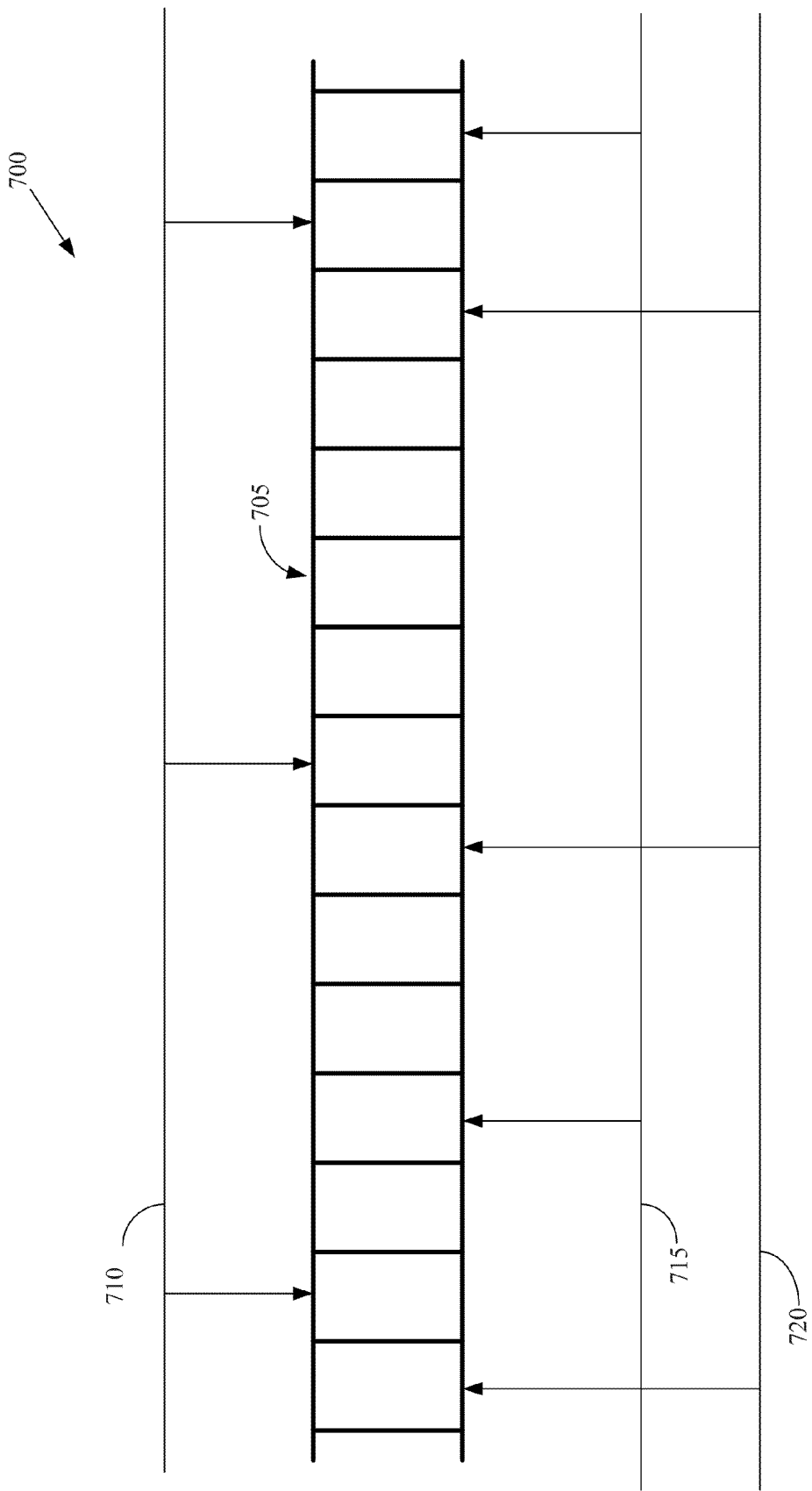
FIG. 7 conceptually illustrates a timing diagram that can be used to provide reference signals that have been modified according to user-specific transform matrices.

FIG. 7 conceptually illustrates a timing diagram 700 that can be used to provide reference signals that have been modified according to user-specific transform matrices. In the illustrated embodiment, reference signals may be transmitted in one or more timeslots 705 (only one indicated by a numeral in FIG. 7). Reference signals that have been modified by applying different transform matrices can be transmitted in different sequences of the timeslots 705. For example, reference signals that have been modified by applying a first set of transform matrices may be transmitted in the slots indicated by the arrows 710. The first set of transform matrices may be associated with a particular antenna configuration, a set of main antennas and/or RRHs, a particular vertical or height displacement, and the like. Reference signals that have been modified by applying a second set of transform matrices may be transmitted in the slots indicated by the arrows 715 and reference signals that have been modified by applying a third set of transform matrices may be transmitted in the slots indicated by the arrows 720. User equipment can be instructed to monitor the appropriate set of timeslots 705 so that they receive reference signals that have been modified by the assigned UE-specific transform matrices.

Figure 8:
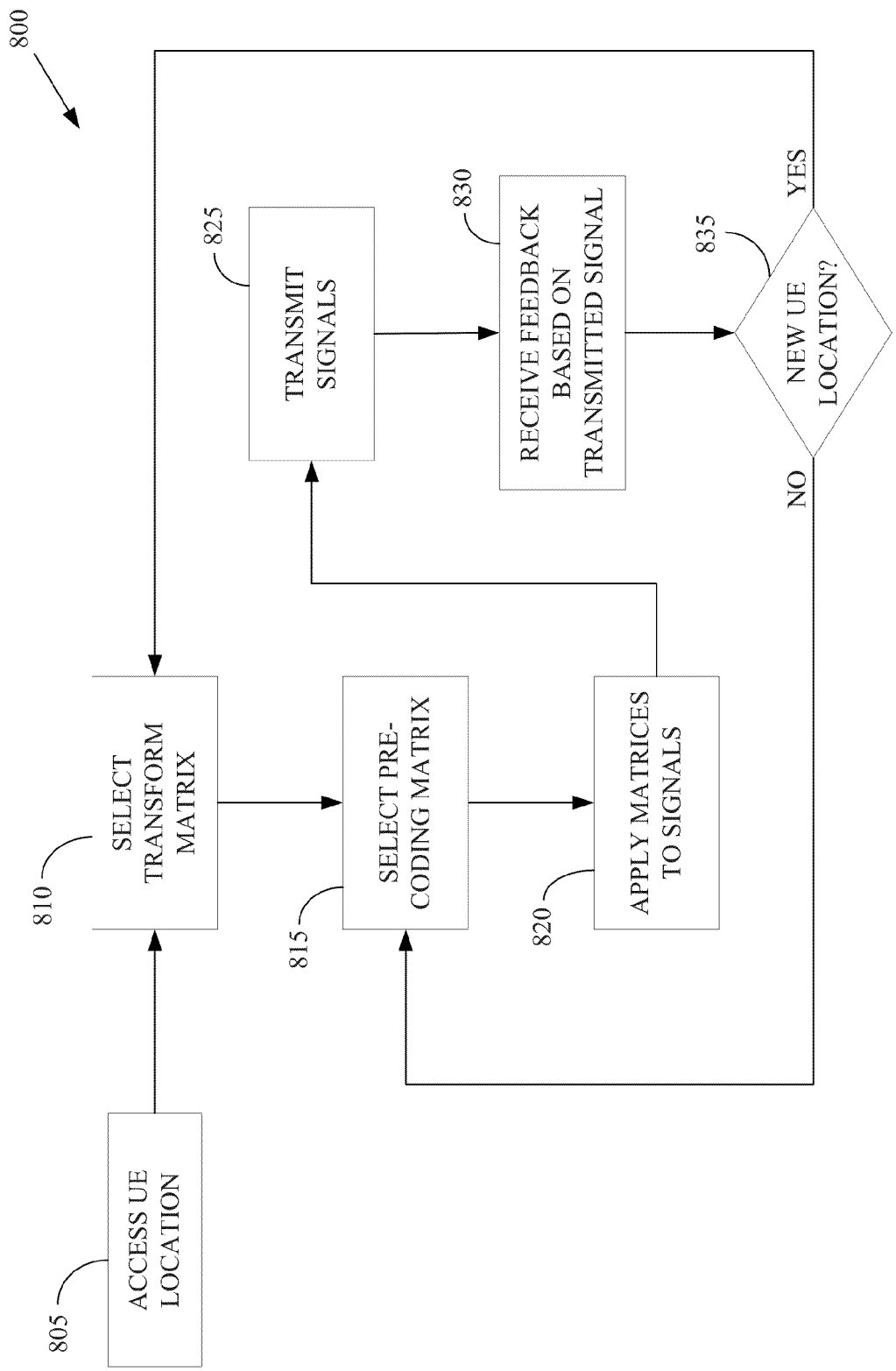
FIG. 8 conceptually illustrates a first exemplary embodiment of a method for transforming pre-coded signals for transmission over a downlink of an air interface.

FIG. 8 conceptually illustrates a first exemplary embodiment of a method 800 for transforming pre-coded signals for transmission over a downlink of an air interface. In the illustrated embodiment, the method 800 may be implemented in a base station or eNodeB. Persons of ordinary skill in the art having benefit of the present disclosure should appreciate that FIG. 8 depicts the method 800 as a particular set of operations that are performed in a particular order. However, alternative embodiments of the method 800 may perform these operations in a different order and/or may perform some operations concurrently with other operations. In the illustrated embodiment, the base station accesses (at 805) information that indicates the location of one or more user equipment. The information may include global positioning system (GPS) information, information provided by the user equipment or the network, ranging information, and the like. One or more transform matrices may then be selected (at 810) based on the location of the user equipment.

A pre-coding matrix can also be selected (at 815) from a codebook, such as a codebook that includes a standard predetermined set of pre-coding matrices. In one embodiment, the feedback received from one or more user equipment may be used to select (at 815) the pre-coding matrix. The transform matrix and the pre-coding matrix may be applied (at 820) to a signal to modify the signal prior to transmitting the signal from the base station over the air interface. The modified signals are then transmitted (at 825) over the air interface. In one embodiment, the base station waits to receive (at 830) feedback from user equipment. The received feedback may be generated by user equipment based on the transmitted signal, such as a reference signal. In the illustrated embodiment, the base station determines (at 835) whether the user equipment has moved to a new location. This determination may be based on revised location information and/or feedback received (at 830) from user equipment. If the user equipment has remained in the same location, then it may not be necessary to select (at 810) a new transform matrix and the method 800 may proceed by selecting (at 815) a pre-coding matrix for subsequent transmissions. If the user equipment has moved, then a new transform matrix may be selected (at 810) for the new location before proceeding with determining (at 815) the pre-coding matrix. The method 800 may proceed in this manner as long as there is information to be transmitted over the air interface.

Figure 9:
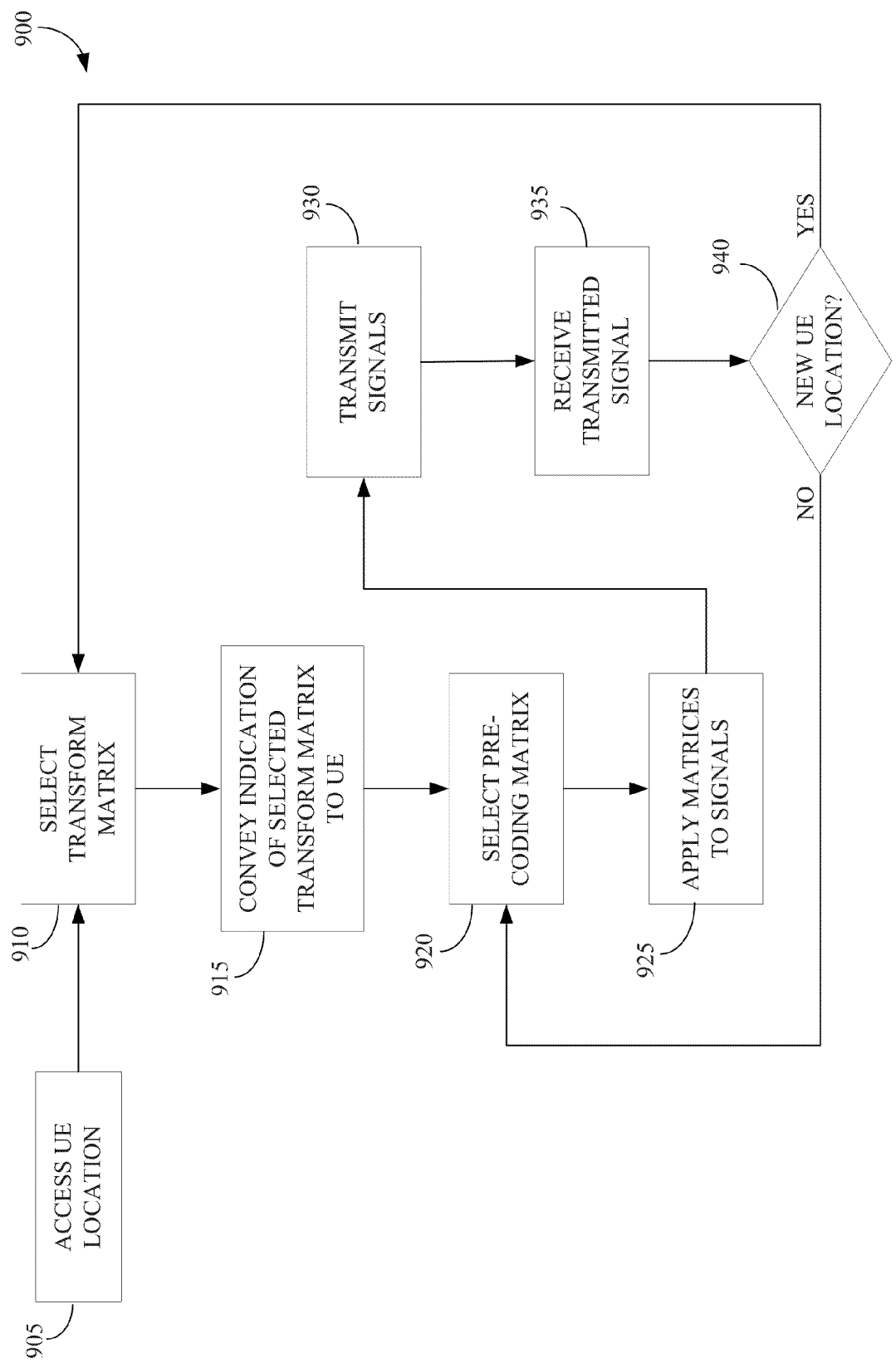
FIG. 9 conceptually illustrates a first exemplary embodiment of a method for transforming pre-coded signals for transmission over an uplink of an air interface.

FIG. 9 conceptually illustrates a first exemplary embodiment of a method 900 for transforming pre-coded signals for transmission over an uplink of an air interface. In the illustrated embodiment, portions of the method 900 may be implemented in a base station, eNodeB, mobile unit, or user equipment. Persons of ordinary skill in the art having benefit of the present disclosure should appreciate that FIG. 9 depicts the method 900 as a particular set of operations that are performed in a particular order. However, alternative embodiments of the method 900 may perform these or other operations in a different order and/or may perform some operations concurrently with other operations. In the illustrated embodiment, the base station or user equipment accesses (at 905) information that indicates the location of the user equipment. The information may include global positioning system (GPS) information, information provided by the user equipment or the network, ranging information, and the like. One or more transform matrices may then be selected (at 910) based on the location of the user equipment. In embodiments in which the base station selects (at 910) the transform matrix, an indication of the selected matrix may be conveyed (at 915) to the user equipment. This information may include an actual transform matrix or an indication that the user equipment should use a particular transform matrix stored or generated by the user equipment.

The user equipment selects (at 920) a pre-coding matrix from a codebook, such as a codebook that includes a standard predetermined set of pre-coding matrices. The user equipment can apply (at 925) the transform matrix and the pre-coding matrix to a signal to modify the signal prior to transmitting the signal over the uplink. The modified signals are then transmitted (at 930) over the uplink of the air interface. In one embodiment, the user equipment may receive (at 935) downlink transmissions from the base station and may in some cases provide feedback based on the received downlink transmission. The base station or the user equipment may determine (at 940) whether the user equipment has moved to a new location, e.g., using revised location information and/or feedback. If the user equipment has remained in the same location, then it may not be necessary to select (at 910) a new transform matrix and the method 900 may proceed by selecting (at 920) a pre-coding matrix for subsequent transmissions. If the user equipment has moved, then a new transform matrix may be selected (at 910) before proceeding. The method 900 may proceed in this manner as long as there is information to be transmitted over the uplink.

Figure 10:
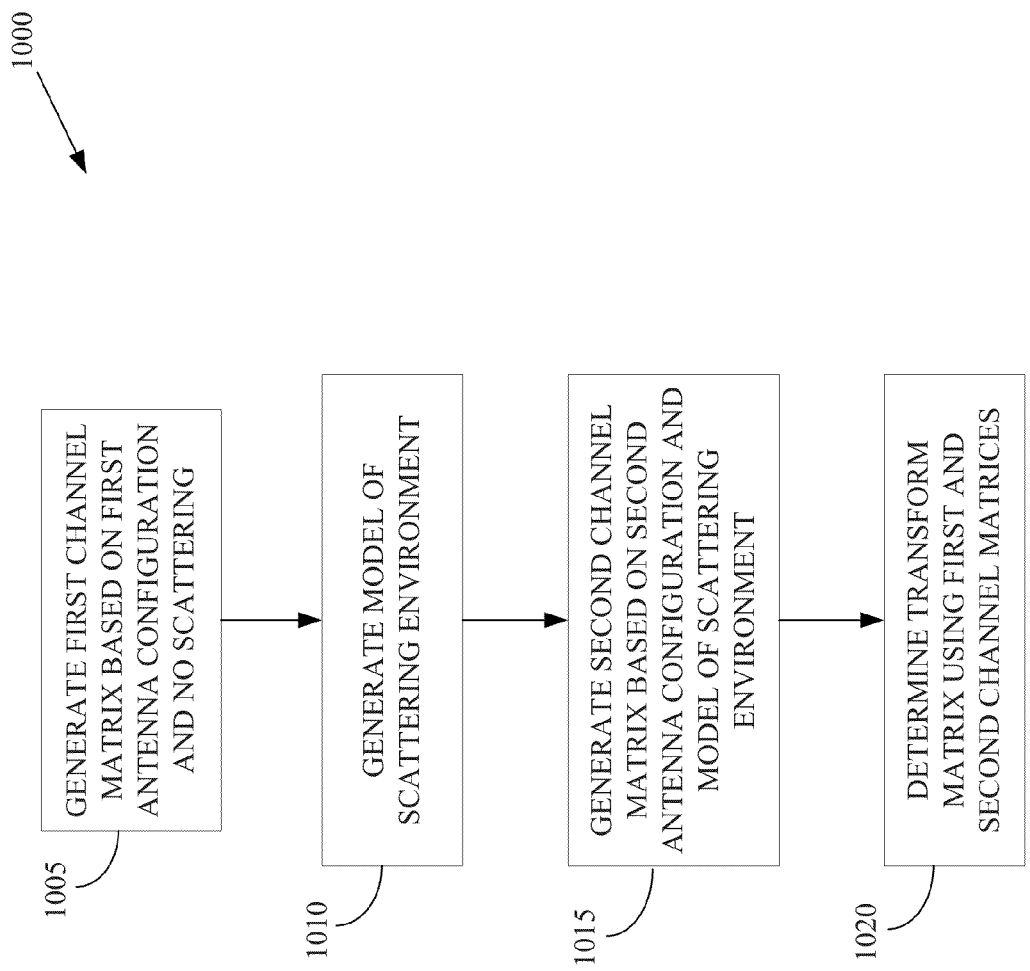
FIG. 10 conceptually illustrates one exemplary embodiment of a method for determining transform matrices.

FIG. 10 conceptually illustrates one exemplary embodiment of a method 1000 or determining transform matrices. In the illustrated embodiment, one or more transform matrices $T_{C,i}^{M \times K}$ (where j=1, 2, ..., I are the indices of each matrix) can be computed based on the standard antenna configuration used to define the standard codebooks, the deployed antenna configuration, and information about the scattering environment. The computation can be performed off-line, e.g. during the cell planning, using simulations based on theoretical relations, empirical relations, or other relations or information. In one embodiment, each transform matrix $T_{C,i}^{M \times K}$ is associated with the coverage of its own special antenna configuration or subset of an antenna configuration, geographical location information such as a geographically collocated or separated antenna allocation, and/or vertical coverage information such as different angle spreads of the different transform matrices. In the illustrated embodiment, a first channel matrix is generated (at 1005) based on a first antenna configuration and assuming no scattering. For example, the first channel matrix can be defined (at 1005) for a standardized antenna configuration.

A model of the scattering environment can then be generated (at 1010). In one embodiment, the model is generated (at 1010) using information about the geographical location of the deployed antenna array. The information may be derived theoretically, empirically, manually, and/or using other techniques or combinations of techniques. A second channel matrix may then be generated (at 1015) based on the deployed antenna configuration and the model of the scattering environment. For example, techniques such as ray tracing techniques may be used to define the second channel matrix for the deployed antenna configuration and the scattering environment. A transform matrix can be determined (at 1020) using the first and second channel matrices. For example, the transform matrix may be defined as:

$$T_{C,i}^{M \times K} = (H_{C,i}^{K \times N})^{-1} H_{std}^{M \times N}$$

However, in alternative embodiments, other techniques may be used to define (at 1020) the transform matrix in terms of the first and second channel matrices.

In one embodiment, the set of transform matrices $T_{C,i}^{M \times K}$ may be calibrated as part of the deployment to different antenna configurations or subsets, different geographical locations, different vertical angle spreads of the beams, and the like. For DL MIMO, the transform matrices may be calibrated using the UE measurements, which are fed back to the base station. The calibration procedures can be used to test pre-calculated transform matrixes and adjust the parameters of these matrices to achieve highest received signal to noise ratio at the user equipment based on the location of the user equipment within the coverage of the corresponding antenna configuration. For UL MIMO, several transform matrices could be downloaded to the test UE during the calibration process. Since each UE manufacturer implements a different antenna design for each UE model, the transform matrix would be tested for each model. In one embodiment, the base station may measure the received signal quality and determine the best transform matrix for each UE antenna configuration and geographical location.

The coverage area and antenna configuration subset could, in some embodiments, be logged into a database that is indexed by a 3-dimensional geographical coordinate. Entries corresponding to each 3-D coordinate may contain a subset of antenna configurations and an estimate of UE location determined by uplink signals, such as the range of uplink received signal strength and angle of arrival corresponding to each location. The log could be used by the base station to determine the location of the user equipment and the downlink antenna configuration. For example, the base station could measure a received signal strength and angle-of-arrival and use this information to determine whether user equipment at the location corresponding to the received signal strength and angle-of-arrival are covered by a central antenna, one or more RRHs, or a combination thereof. The test procedure could be done at the conformance test stage, Inter-Operation Test (IoT) stage, the radiofrequency (RF) optimization stage, or at any other stage during or after deployment of one or more base stations or antenna configurations.

Once defined and calibrated, the appropriate transform matrices may be selected based on the location of the user equipment and the associated antenna configuration used to provide wireless connectivity to the user equipment. The selected transform matrices may then be applied to (or in conjunction with) the pre-coding codebook. For downlink and uplink MIMO, the transform matrices may be applied to the codebook based on the given antenna configuration used to provide wireless connectivity to the location of the user equipment. In various alternative embodiments, base stations may estimate the location of the user equipment using uplink received signals, such as DM RS, SRS, PUCCH, PUSCH, and the like. The received signal strength and angle of arrival of each UE can be estimated using the uplink received signals. The UE location and its associated antenna configuration may then be determined based on the 3-D coordinate in the log collected during the deployment.

Reference signals associated with different user equipment may also be modified using the transform matrices. In one embodiment, each transform matrix may be applied to a subset of the configured reference signals. The reference signal configuration may be UE-specific. For example, one subset of CSI-RS configuration may be associated with one antenna configuration based on UE geographical location such as an RRH coverage area, a vertical beam location, and the like. For DL MIMO, the transform matrix may be applied to the CSI-RS since it is a UE-specific configuration. Each CSI-RS subset is associated with one transform matrix based on the geographical coverage area. For example, different transform matrices may be associated with coverage areas that receive wireless connectivity from an antenna configuration at a central site only, an antenna configuration with central site and RRH. For another example, different transform matrices may be used for different vertical coverage areas in a high rise building or apartment complex. For UL MIMO, the transform matrices may be applied to the SRS, which includes either periodic or aperiodic SRS, when multiple SRS are configured for a specific UE for UL MIMO. Each precoded SRS may be designed to cover a different antenna configuration seen by different user equipment. For DL and UL MIMO, an RRC reconfiguration message may be sent from the base station to user equipment in response to changes in the antenna configuration associated with the user equipment. For example, a reconfiguration message may be sent when the number/configuration of downlink antennas seen by user equipment changes from a central antenna to both the central antenna and one or more RRHs. The user equipment may apply a new transform matrix to the UL codebook for PUSCH and SRS for UL MIMO. The UE may also feedback the CSI based on the new precoded CSI-RS configuration.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
applying, at a transmitter, a transform matrix and a pre-coding matrix to a signal prior to transmitting the signal using a plurality of antennas deployed in a first antenna configuration, wherein the pre-coding matrix is selected from a codebook defined for a second antenna configuration that differs from the first antenna configuration, and wherein the transform matrix converts channel matrices defined for the first antenna configuration into channel matrices defined for the second antenna configuration.

2. The method of claim 1, wherein the first antenna configuration corresponds to a linear antenna array and the second antenna configuration corresponds to a circular array, and wherein the transform matrix converts channel matrices defined for the linear array into channel matrices defined for the circular array.

3. The method of claim 1, wherein the first antenna configuration corresponds to a first linear antenna array and the second antenna configuration corresponds to a second linear antenna array that is oriented at a different angle than the first linear antenna array used to define the codebook, and wherein the transform matrix converts channel matrices defined for the first linear array to channel matrices defined for the second linear antenna array that is oriented at the different angle than the first linear antenna array.

4. The method of claim 1, wherein the transmitter is implemented in a base station, and wherein applying the transform matrix comprises selecting the transform matrix based on location information for user equipment and applying the selected transform matrix to signals transmitted over a downlink towards the user equipment.

5. The method of claims 1, 2, 3, or 4, wherein applying the transform matrix comprises applying the transform matrix to at least one reference signal, and wherein applying the pre-coding matrix comprises selecting the (pre-coding matrix based on feedback that is provided by user equipment in response to said at least one reference signal.

6. The method of claim 5, wherein the user equipment comprises memory containing a stored predetermined codebook of feedback codewords, and wherein the base station indicates to the user equipment a subset of said feedback codewords from which the user equipment may select a codeword, and wherein the feedback provided by the user equipment comprises a codeword selected from said subset.

7. The method of claim 6, wherein the subset indicated by the base station is derived from the first antenna configuration.

8. The method of claim 5, wherein applying the transform matrix comprises applying a plurality of transform matrices associated with a plurality of user equipment to a plurality of reference signal configurations and transmitting the plurality of reference signal configurations in a plurality of different time intervals.

9. The method of claim 1, wherein the transmitter is implemented in user equipment, and wherein applying the transform matrix comprises applying a transform matrix received from abuse station.

10. The method of claim 9, wherein the transform matrix is determined based on a location of the user equipment.

11. The method of claim 9, wherein the transform matrix is determined based on a measurements made by the base station on reference signal transmissions made by the user equipment.

12. The method of claim 9, wherein applying the transform matrix comprises applying the transform matrix to at least one of a signal transmitted over a shared uplink channel or a sounding reference signal transmitted over the uplink.

13. The method of claim 1, wherein the pre-coding matrix is selected from a codebook defined for a second antenna configuration assuming a non-scattering environment, and wherein the transform matrix is determined based on information indicative of a scattering environment.

14. The method of claim 1, comprising transmitting the signal via the plurality of antennas deployed in the first antenna configuration after modifying the signal by applying the transform matrix and the pre-coding matrix, and wherein the transform matrix converts a transmitted waveform of the signal transmitted via the plurality of antennas deployed in the first antenna configuration into a transmitted waveform that would be transmitted via a plurality of antennas deployed in the second antenna configuration.

15. A method, comprising:
selecting, at a functional entity within a wireless communication network, a transform matrix associated with user equipment, wherein the transform matrix and a pre-coding matrix are selected for application to a first signal prior to transmitting the first signal using a plurality of antennas deployed in a first antenna configuration, wherein the pre-coding matrix is selected from a codebook defined for a second antenna configuration that is different than the first antenna configuration, and wherein the transform matrix converts channel matrices defined for the first antenna configuration into channel matrices defined for the second antenna configuration; and
transmitting a second signal using the plurality of antennas, wherein the second signal is formed by applying the transform matrix and the pre-coding matrix to the first signal.

16. The method of claim 15, wherein selecting the transform matrix comprises selecting the transform matrix based on a location of the user equipment.

17. The method of claim 15, wherein selecting the transform matrix comprises selecting the transform matrix for application to the first signal for transmission over a downlink from a base station to the user equipment.

18. The method of claim 15, wherein selecting the transform matrix comprises selecting the transform matrix tier application to the first signal tier transmission over an uplink from the user equipment to at least one base station.

19. The method of claim 18, comprising providing information indicating the selected transform matrix to said at least one base station for transmission to the user equipment.

20. A method, comprising:
determining a transform matrix for a transmitter that converts channel matrices defined for a first antenna configuration into channel matrices defined for a second antenna configuration that differs from the first antenna configuration, wherein the transform matrix and a pre-coding matrix are configured to be applied to a signal prior to transmitting the signal using a plurality of antennas deployed in the first antenna configuration, wherein the pre-coding matrix is selected from a codebook defined for the second antenna configuration; and
storing a representation of the transform matrix in a computer-readable form.

21. The method of claim 20, wherein determining the transform matrix comprises determining the transform matrix by simulating propagation of radiofrequency signals in a scattering environment associated with the transmitter.

22. The method of claim 20, wherein determining the transform matrix comprises determining the transform matrix that converts channel matrices defined for a first antenna configuration comprising a circular antenna array into channel matrices defined for a second antenna configuration comprising a linear antenna array.

23. The method of claim 20, wherein determining the transform matrix comprises determining the transform matrix that converts channel matrices defined for a first antenna configuration comprising a first linear antenna array having a first orientation into channel matrices defined for a second antenna configuration comprising a second linear antenna array having a second orientation that is different than the first orientation.

24. The method of claim 20, wherein determining the transform matrix comprises determining the transform matrix for application to a downlink signal transmitted from a base station to user equipment, and wherein the transform matrix converts a transmitted waveform of the downlink signal transmitted via the plurality of antennas deployed in the first antenna configuration into a transmitted waveform that would be transmitted via a plurality of antennas deployed in the second antenna configuration.

25. The method of claim 24, comprising calibrating the transform matrix based on measurements feedback from the user equipment indicating a signal-to-noise ratio for signals modified using the transform matrix and received by the user equipment.

26. The method of claim 20, wherein determining the transform matrix comprises determining the transform matrix for application to an uplink signal transmitted from user equipment to a base station.

27. The method of claim 26, comprising calibrating the transform matrix by providing a plurality of transform matrices to the user equipment and selecting at least one of the provided transform matrices based on measured qualities of signals received from the user equipment.

28. A transmitter, comprising:
a transceiver configured to transmit or receive signals using a plurality of antennas deployed in a first antenna configuration;
a pre-coding matrix generator for generating or storing a codebook comprising a plurality of pre-coding matrices defined for a second antenna configuration that is different than the first antenna configuration;
a transform matrix generator for generating or storing at least one transform matrix that converts channel matrices defined for the first antenna configuration into channel matrices defined for the second antenna configuration, wherein the transceiver is configurable to apply said at least one transform matrix and a pre-coding matrix selected from the codebook to a signal prior to transmitting the signal.

29. The transmitter of claim 28, wherein the transmitter is implemented in a base station, and wherein applying the transform matrix comprises selecting a transform matrix based on location information for user equipment and wherein the transceiver is configurable to apply the selected transform matrix to signals transmitted over a downlink towards the user equipment, and wherein the transform matrix converts a transmitted waveform of the downlink signal transmitted via the plurality of antennas deployed in the first antenna configuration into a transmitted waveform that would be transmitted via a plurality of antennas deployed in the second antenna configuration.

30. The transmitter of claim 28, wherein the transmitter is implemented in user equipment, and wherein the transform matrix generator is configured to store said at least one transform matrix received from a base station.

31. The transmitter of claim 30, wherein the transform matrix generator is configurable to generate said at least one transform matrix based on a location of the user equipment.

32. A base station, comprising:
a plurality of antennas deployed in a first antenna configuration;
a transmitter configured to transmit signals using the plurality of antennas;
a pre-coding matrix generator for generating or storing a codebook comprising a plurality, of pre-coding matrices defined tier a second antenna configuration that is different than the first antenna configuration;
a transform matrix generator for generating or storing at least one transform matrix that converts channel matrices defined for the first antenna configuration into channel matrices defined for the second antenna configuration, wherein the transmitter is configurable to apply said at least one transform matrix and a pre-coding matrix selected from the codebook to a signal prior to transmitting the signal.

33. The base station of claim 32, wherein the base station is configurable to select a transform matrix based on location information for user equipment and the transmitter is configurable to apply the selected transform matrix to signals transmitted over a downlink towards the user equipment.

34. The base station of claim 32, wherein the transmitter is configurable to apply the transform matrix to at least one reference signal transmitted using the plurality of antennas, and wherein the base station is configurable to select, the pre-coding matrix based on feedback that is provided by user equipment in response to said at least one reference signal, and wherein the transform matrix converts a transmitted waveform of said at least one reference signal transmitted via the plurality of antennas deployed in the first antenna configuration into a transmitted waveform that would be transmitted via a plurality of antennas deployed in the second antenna configuration.

35. The base station of claim 34, wherein the transmitter is configurable to transmit signals to the user equipment indicating a subset of feedback codewords from which the user equipment may select a codeword, and wherein the feedback provided by the user equipment comprises a codeword selected from said subset.

36. The base station of claim 35, the subset indicated by the base station is derived from the first antenna configuration.

37. The base station of claim 32, wherein the transmitter is configured to apply a plurality of transform matrices associated with a plurality of user equipment to a plurality of reference signal configurations and transmit the plurality of reference signal configurations in a plurality of different time intervals.

38. User equipment, comprising:
a plurality of antennas deployed in a first antenna configuration;
a transmitter configured to transmit signals using the plurality of antennas;
a pre-coding matrix generator for generating or storing a codebook comprising a plurality of pre-coding matrices defined for a second antenna configuration that is different than the first antenna configuration;
a transform matrix generator for generating or storing at least one transform matrix that converts channel matrices defined for the first antenna configuration into channel matrices defined for the second antenna configuration, wherein the transmitter is configurable to apply said at least one transform matrix and a pre-coding matrix selected from the codebook to a signal prior to transmitting the signal.

39. The user equipment of claim 38, wherein the user equipment is configurable to receive information indicating said at least one transform matrix and wherein the transmitter is configurable to apply said at least one transform matrix to signals transmitted using the plurality of antennas.

40. The user equipment of claim 38, wherein said at least one transform matrix is determined based on a location of the user equipment.

41. The user equipment of claim 38, wherein the transform matrix generator is configurable to determine said at least one transform matrix based on a measurement made by a base station on reference signal transmission made by the user equipment.

42. The user equipment of claim 38, wherein the transmitter is configured to apply the transform matrix to at least one of a signal transmitted over a shared uplink channel or a sounding reference signal transmitted over the uplink, and wherein the transform matrix converts a transmitted waveform of the uplink signal transmitted via the plurality of antennas deployed in the first antenna configuration into a transmitted waveform that would be transmitted via a plurality of antennas deployed in the second antenna configuration.

43. The user equipment of claim 38, wherein the user equipment is configured to select at least one pre-coding matrix to be used by a base station to transmit downlink signals, wherein said at least one pre-coding matrix is selected based upon measurements performed on at least one downlink signal received from the base station.

44. The user equipment of claim 43, wherein the transmitter is configured to transmit feedback indicating said at least one pre-coding matrix.

* * * * *

UNITED STATES PATENT AND TRADEMARK OFFICE
CERTIFICATE OF CORRECTION

PATENT NO. : 8,675,762 B2
APPLICATION NO. : 13/098693
DATED : March 18, 2014
INVENTOR(S) : Fang-Chen Cheng et al.

Page 1 of 1

It is certified that error appears in the above-identified patent and that said Letters Patent is hereby corrected as shown below:

In the Claims

Column 15, Line 13, please change "pre-coding matrix comprises selecting the (pre-coding matrix" to
-- pre-coding matrix comprises selecting the pre-coding matrix --

Column 15, Line 35, please change "from abuse station." to -- from a base station. --

Column 16, Line 19, please change "selecting the transform matrix tier application to the first signal tier transmission" to -- selecting the transform matrix for application to the first signal for transmission --

Column 17, Line 55, please change "defined tier a second antenna configuration" to -- defined for a second antenna configuration --

Column 18, Line 6, please change "and wherein the base station is configurable to select, the" to -- and wherein the base station is configurable to select the --

Signed and Sealed this
Thirtieth Day of June, 2015

Michelle K. Lee
*Director of the United States Patent and Trademark Office*